(12) United States Patent
Fukumoto et al.

(10) Patent No.: US 7,083,669 B2
(45) Date of Patent: Aug. 1, 2006

(54) INK COMPOSITION, INKJET RECORDING METHOD USING THE SAME AND RECORDED MATTER

(75) Inventors: Hiroshi Fukumoto, Nagano (JP); Yasuhiro Oki, Nagano (JP); Kazuhiko Kitamura, Nagano (JP); Hiroko Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 299 days.

(21) Appl. No.: 10/419,720

(22) Filed: Apr. 21, 2003

(65) Prior Publication Data

US 2004/0003755 A1 Jan. 8, 2004

(30) Foreign Application Priority Data

| Apr. 23, 2002 | (JP) | P.2002-120064 |
| Sep. 9, 2002 | (JP) | P.2002-263295 |
| Jan. 9, 2003 | (JP) | P.2003-003448 |
| Mar. 28, 2003 | (JP) | P.2003-090345 |

(51) Int. Cl.
C09D 11/00 (2006.01)
C09D 11/02 (2006.01)
B41J 2/01 (2006.01)

(52) U.S. Cl. .................. 106/31.49; 106/31.58; 347/100

(58) Field of Classification Search .......... 106/31.49, 106/31.58; 347/100; 428/195.1
See application file for complete search history.

(56) References Cited

U.S. PATENT DOCUMENTS

| 4,101,329 A | * | 7/1978 | Loock | 106/31.43 |
| 4,163,675 A | * | 8/1979 | Hirano et al. | 106/31.43 |
| 4,557,618 A | * | 12/1985 | Iwata et al. | 401/34 |
| 4,865,648 A | * | 9/1989 | Kito et al. | 106/31.17 |
| 5,478,383 A | * | 12/1995 | Nagashima et al. | 106/31.43 |
| 6,231,653 B1 | | 5/2001 | Lavery et al. | 106/31.36 |
| 6,319,309 B1 | | 11/2001 | Lavery et al. | 106/31.27 |
| 6,358,304 B1 | | 3/2002 | Kapoor | 106/31.86 |
| 6,572,690 B1 | * | 6/2003 | Rehman et al. | 106/31.58 |
| 6,740,690 B1 | * | 5/2004 | Nakano et al. | 523/160 |
| 2003/0164114 A1 | * | 9/2003 | Kitayama et al. | 106/31.46 |

FOREIGN PATENT DOCUMENTS

| EP | 1146097 | 10/2001 |
| JP | 6-25575 | 6/1994 |
| JP | 7-228810 | 7/1995 |
| WO | 02/08340 | 1/2002 |

OTHER PUBLICATIONS

Kulvanich, P. and Leesawat, P.; 1996; Release Characteristics of the Matrices . . . Agents; Proceedings of the Int'l. Symposium on Controlled Releas Bioactive Material, 23, 143–144, no month available.

Liao C.W. et al.; 2001, Release Characteristics of . . . Dispersion; J. Microencapsu vol. 18, No. 3; 258–297, no month available.

* cited by examiner

*Primary Examiner*—Helene Klemanski
(74) *Attorney, Agent, or Firm*—Ladas and Parry LLP (57) ABSTRACT

The present invention provides an ink composition comprising at least: water; a cyan dye; and an aromatic compound having a carboxyl group and/or a salt thereof. Also disclosed are an inkjet recording method using the ink composition, and recorded matter recorded using the ink composition or by the inkjet recording method.

26 Claims, 2 Drawing Sheets

INK COMPOSITION, INKJET RECORDING METHOD USING THE SAME AND RECORDED MATTER

FIELD OF THE INVENTION

The present invention relates to an ink composition suitable for inkjet recording, more specifically, the present invention relates to an ink composition capable of providing a printed matter having excellent fastness (mainly, fastness to gas and light) and anti-bronzing property, and also relates to an inkjet recording method using the ink composition and recorded matter which is recorded by the recording method.

BACKGROUND OF THE INVENTION

Inkjet recording is a method of recording a letter or image (hereinafter sometimes simply referred to as an "image") on the surface of a recording medium by ejecting an ink composition as small liquid droplets from fine nozzles. Examples of the inkjet recording system which is practically used include a method of converting an electrical signal into a mechanical signal using an electrostrictive element and intermittently ejecting an ink composition stored in the nozzle head part to record a letter or an image on the surface of a recording medium, and a method of rapidly heating an ink composition stored in the nozzle head part at a portion very close to the ejection part to generate bubbles and intermittently ejecting the ink composition using the volume expansion due to bubbles to record a letter or an image on the surface of a recording medium.

The ink composition for inkjet recording is generally obtained, in view of safety and printing property, by dissolving a dye of various types in water, an organic solvent or a mixed solution thereof, and various properties required of the ink composition are more strict as compared with the ink composition for writing tools such as fountain pen and ballpoint pen.

Particularly, in recent years, an inkjet printer is employed for the preparation of printed matters for advertisement and in forming a color image using a plurality of ink compositions, the requirements are more severe.

This is because, in the color image formed using a plurality of ink compositions, if even one color present has poor color hue, the color hue impairs the color balance of the image as a whole and a high-quality image cannot be obtained.

In performing printing using an ink composition (particularly when a metal phthalocyanine-base dye is used as a coloring material), a phenomenon that the portion of high-duty printing such as solid printing (full solid of 100% duty) looks reddish (hereinafter referred to as a "bronzing phenomenon") sometimes occurs. This gives rise to a non-uniform color balance as the entire image and decreases the image quality and in this respect, improvements are being demanded.

Furthermore, in recent years, a gloss paper is employed in many cases as a recording medium having a feeling close to photographic touch, however, due to a bronzing phenomenon caused by a specific color, the gloss feeling on the printed matter surface is fluctuated to seriously impair the feeling of image. Therefore, also from the standpoint of maintaining the gloss feeling of the image as a whole, improvements are being keenly demanded.

The printed matter prepared using the above-described ink composition is disposed not only indoors of course but also outdoors sometimes and therefore, is exposed to various lights (including sunlight) and outside airs (e.g., ozone, nitrogen oxide, sulfur oxide). To cope with this, development of an ink composition excellent in the fastness to light and gas is being made but the bronzing phenomenon is outstanding particularly in the case of using a cyan ink composition improved in the gas fastness from the aspect of dye itself, and in this respect, improvements are being demanded.

In the case where a dye having poor solubility in water is used in the ink composition for inkjet recording, it is known that a so-called bronzing phenomenon occurs when printing is performed on a recording medium having strong acidity.

To solve this problem, generally, an alcohol amine is added as the pH maintaining agent or the penetration into paper is intensified. The bronzing phenomenon is considered to fundamentally occur due to crystallization of a dye resulting from drying of the ink composition on the paper surface and the above-described method is effective from the standpoint of elevating the solubility to prevent the crystallization or attaining penetration of the ink composition into paper before the dye is crystallized. However, in the former method, the pH readily elevates to the vicinity of 11 by the addition of alcohol amines and this may cause corrosion of nozzles of the printer or adversely affect the human body. In the latter method, if the penetration is excessively intensified, a so-called bleeding phenomenon and deterioration in other printing qualities are brought about. Therefore, these methods are not perfect.

For solving these problems, an ink composition where 2-oxo-oxazolidone or 1,3-bis($\beta$-hydroxyethyl)urea is added has been proposed as an alternative (see, for example, Patent Publication 1 identified below).

Also, an ink composition where a basic amino acid is added with an attempt to solve these problems has been proposed (see, for example, Patent Publication 2 identified below).

However, it is regrettably found from the results of various investigations and studies by the present inventors that even if these techniques are employed, no effect is provided on the elimination or reduction of a bronzing phenomenon in the case of an ink composition using a cyan-type dye which ensures excellent fastness (mainly, fastness to light and gas) of the printed matter.

Patent Publication 1:
JP-A-6-25575 (the term "JP-A" as used herein means an "unexamined published Japanese patent application").

Patent Publication 2:
JP-A-7-228810

SUMMARY OF THE INVENTION

The present invention has been made taking into account these circumstances.

Accordingly, an object of the present invention is to provide an ink composition excellent in the fastness (mainly, fastness to gas and light) of printed matter, particularly, an ink composition more improved in the gas fastness (resistance against ozone and nitrogen oxide) and in the bronzing phenomenon.

Another object of the invention is to provide such an ink composition which is also improved in the clogging resistance.

A still other object of the invention is to provide an inkjet recording method using the ink composition.

A still other object of the invention is to provide recorded matter which is recorded by the inkjet recording method.

Other objects and effects of the invention will become apparent from the following description.

The present inventors continuously made investigations and studies on light fastness, gas fastness, prevention of bronzing phenomenon and the like of various known cyan-type dyes, as a result, it was found that when an aromatic compound having a carboxyl group and/or a salt thereof is added to an ink composition containing a cyan-type dye, the fastness of printed matter and the bronzing phenomenon are improved; the improvement is more remarkable for a specific cyan dye; when the salt of the compound having a carboxyl group added is a lithium salt, the remarkable improvement is attained not only in the bronzing phenomenon but also in the clogging resistance; and when among the compounds having a carboxyl group and/or salts thereof, a compound having a —OR group (wherein R is a C1–C6 alkyl group) and/or a salt thereof is used, excellent effect is provided on the resistance against nitrogen oxide. The present invention has been accomplished based on these findings.

That is, the above-described objects of the invention have been achieved by providing the following ink compositions, inkjet recording methods and recorded matter.

1. An ink composition comprising at least:
water;
a cyan dye; and
an aromatic compound having a carboxyl group and/or a salt thereof.

2. The ink composition according to the above item 1, wherein said cyan dye is a metal phthalocyanine dye.

3. The ink composition according to the above item 2, wherein said metal phthalocyanine dye is a copper phthalocyanine dye represented by the following formula (1):

(1)

wherein $R^1$ represents H, an alkali metal or —NH$_4$, $R^2$ represents an alkali metal or —NH$_4$, $R^3$ represents H, an alkyl group which may be substituted, or an aryl group which may be substituted, k, l and n each represents an integer of 0 to 3, and m represents an integer of 1 to 4, provided that the sum of k, l, m and n is 4.

4. The ink composition according to the above item 3, wherein said copper phthalocyanine dye is at least one of C.I. Direct Blue 86, 87 and 199.

5. The ink composition according to any one of the above items 2 to 4, wherein said metal phthalocyanine dye is a dye having an absorption spectrum in the visible region (400 to 800 nm) with a maximum absorption peak at a wavelength of 590 to 650 nm.

6. The ink composition according to any one of the above items 2 to 4, wherein said metal phthalocyanine dye is a dye having an absorption spectrum in the visible region (400 to 800 nm) with a maximum absorption peak at a wavelength of 590 to 615 nm.

7. The ink composition according to any one of the above items 2 to 4, wherein said metal phthalocyanine dye is a dye having an absorption spectrum in the visible region (400 to 800 nm) with a maximum absorption peak at a wavelength of 590 to 605 nm.

8. The ink composition according to any one of the above items 1 to 7, wherein said aromatic compound having a carboxyl group and/or a salt thereof is an aromatic compound having one carboxyl group and/or a salt thereof.

9. The ink composition according to any one of the above items 1 to 8, wherein said aromatic compound having a carboxyl group and/or a salt thereof is a compound having a naphthalene skeleton and/or a salt thereof.

10. The ink composition according to the above item 9, wherein said compound having a naphthalene skeleton and/or a salt thereof is a compound having a carboxyl group and a —OR group (wherein R is a C1–C6 alkyl group) in the naphthalene skeleton and/or a salt thereof.

11. The ink composition according to the above item 10, wherein said compound having a naphthalene skeleton and/or a salt thereof is a compound having one carboxyl group and one —OR group (wherein R is a C1–C6 alkyl group) in the naphthalene skeleton and/or a salt thereof.

12. The ink composition according to any one of the above items 9 to 11, wherein said compound having a naphthalene skeleton and/or a salt thereof is a compound having a carboxyl group at the 2-position and/or a salt thereof.

13. The ink composition according to the above item 12, wherein said compound having a carboxyl group at the 2-position and having a naphthalene skeleton and/or a salt thereof is at least one member selected from the group consisting of 1-hydroxy-2-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid and their salts.

14. The ink composition according to any one of the above items 1 and 8 to 13, wherein said salt is a lithium salt.

15. The ink composition according to any one of the above items 1 to 14, which comprises said aromatic compound having a carboxyl group and/or a salt thereof in an amount of 0.1 to 10 wt % based on the entire amount of the ink composition.

16. The ink composition according to any one of the above items 1 to 15, wherein the content ratio of said cyan dye and said aromatic compound having a carboxyl group and/or a salt thereof is from 1:0.5 to 1:10.

17. The ink composition according to any one of the above items 1 to 16, which further comprises a nonionic surfactant.

18. The ink composition according to the above item 17, wherein said nonionic surfactant is an acetylene glycol surfactant.

19. The ink composition according to the above item 17 or 18, which comprises said nonionic surfactant in an amount of 0.1 to 5 wt % based on the entire amount of the ink composition.

20. The ink composition according to any one of the above items 1 to 19, which further comprises a penetration accelerator.

21. The ink composition according to the above item 20, wherein said penetration accelerator is a glycol ether.

22. The ink composition according to any one of the above items 1 to 21, wherein the pH of the ink composition at 20° C. is from 8.0 to 10.5.

23. An inkjet recording method of performing the recording by ejecting a liquid droplet of an ink composition and attaching said liquid droplet to a recording medium, wherein the ink composition is an ink composition according to any one of the above items 1 to 22.

24. The inkjet recording method according to the above item 23, wherein said ejected liquid droplet is formed by mechanical deformation of an electrostrictive element.

25. Recorded matter which is recorded using an ink composition according to any one of the above items 1 to 22.

26. Recorded matter which is recorded by a recording method according to the above item 23 or 24.

DETAILED DESCRIPTION OF THE INVENTION

The ink composition of the present invention comprises, in an aqueous medium comprising water or water and a water-soluble organic solvent, at least a cyan-type dye and an aromatic compound having a carboxyl group and/or a salt thereof and, if desired, contains a humectant, a viscosity adjusting agent, a pH adjusting agent and other additives.

The cyan-type dye for use in the ink composition of the present invention is not particularly limited, however, the improvement effect is higher with a metal phthalocyanine-base dye, and still higher with a copper phthalocyanine-base dye among metal phthalocyanine-base dyes.

Examples of the copper phthalocyanine-base dye include a dye represented by the following formula (1):

(1)

wherein $R^1$ represents H, an alkali metal or $-NH_4$, $R^2$ represents an alkali metal or $-NH_4$, $R^3$ represents H, an alkyl group which may be substituted, or an aryl group which may be substituted, k, l and n each represents an integer of 0 to 3, and m represents an integer of 1 to 4, provided that the sum of k, l, m and n is 4.

Specific examples thereof include C.I. Direct Blue 86, 87 and 199.

These dyes can be used individually or in combination and a dye other than those described above may also be used in combination.

In general, when solid printing is performed on an inkjet special recording medium (particularly, gloss-type recording medium) or the like using an ink composition containing a cyan-type dye, a bronzing phenomenon sometimes occurs. Among the cyan-type dyes, cyan-type dyes having excellent fastness both to light and gas are liable to give a stronger bronzing phenomenon at the time of performing solid printing on an inkjet special recording medium (particularly, gloss-type recording medium) or the like using an ink composition containing the dye.

In an inkjet method using such a coloring material, for producing recorded matter free of a bronzing phenomenon, having a high image quality and furthermore capable of preventing discoloration in an oxidative gas atmosphere, for example, in the presence of an ozone, a nitrogen oxide or a sulfur oxide present in air, this can be attained by incorporating an aromatic compound having a carboxyl group.

Specific examples of the cyan-type dye include C.I. Direct Blue 86, 87 and 199.

The content of the dye is preferably from 0.1 to 10 wt %, more preferably from 0.5 to 5 wt %, based on the entire amount of the ink composition, though this is determined according to the kind of dye, the kind of solvent component or the like. With the content of 0.1 wt % or more, color formation and image density on a recording medium can be ensured, and with the content of 10 wt % or less, the viscosity of the ink composition can be easily adjusted and the properties such as ejection reliability and clogging resistance can be readily ensured.

The ink composition of the present invention comprises at least one aromatic compound having a carboxyl group or a salt thereof so as to weaken or eliminate a bronzing phenomenon as encountered in solid printing using the above-described ink composition containing a cyan-type dye and at the same time, improve the fastness of printed matter. When the incorporated aromatic compound having a carboxyl group is an aromatic compound having a —OR group (wherein R is a C1–C6 alkyl group), a remarkably excellent effect is obtained not only in the improvement of bronzing phenomenon but also in the resistance against nitrogen oxide.

That is, in the present invention, as long as the ink composition comprises water, a cyan-type dye and at least one aromatic compound having a carboxyl group or a salt thereof, the bronzing phenomenon as encountered in the solid printing can be weakened or eliminated even if it is an ink composition for a color different from cyan, such as black ink composition, needless to say about a cyan ink composition. For producing these various ink compositions, other conventionally known dye can be used in combination.

The aromatic compound having a carboxyl group or a salt thereof for use in the present invention may be any compound as long as it is an aromatic compound having at least one carboxyl group in the molecular structure or a salt thereof, however, a compound having at least one carboxyl group on a naphthalene skeleton or a salt thereof is preferred, a compound having a carboxyl group at the 2-position and having a naphthalene skeleton or a salt thereof is more preferred, and an alkali metal salt of a compound having a carboxyl group at the 2-position and having a naphthalene skeleton is still more preferred. Among the alkali metal salts of a compound having a carboxyl group at the 2-position and having a naphthalene skeleton, a lithium salt is preferred not only in view of improvement of anti-bronzing property but also in view of clogging resistance.

Also, a compound having at least one carboxyl group and at least one —OR group (wherein R is a C1–C6 alkyl group) in the naphthalene skeleton or a salt thereof is preferred.

Among these, a compound having a carboxyl group at the 2-position and having a naphthalene skeleton or a salt thereof is more preferred not only in view of improvement of anti-bronzing property but also in view of resistance against nitrogen oxide.

Specific examples of the aromatic compound having a carboxyl group or a salt thereof include 1-naphthoic acid, 2-naphthoic acid, 2-hydroxy-1-naphthoic acid, 1-hydroxy-2-naphthoic acid, 3-hydroxy-2-naphthoic acid, 6-hydroxy-2-naphthoic acid, 4-hydroxybenzoic acid, 2,6-naphthalene-dicarboxylic acid, 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, 6-propoxy-2-naphthoic acid and their salts (particularly, lithium salts).

The salt of the aromatic compound having a carboxyl group may be added in the form of a salt and incorporated into ink, or the aromatic compound having a carboxyl group and a base may be added separately to be incorporated into ink.

The content of the aromatic compound having a carboxyl group and/or a salt thereof is preferably from 0.1 to 10 wt %, more preferably from 0.5 to 5 wt %, based on the entire weight of the ink composition, though this is determined according to the kind of the aromatic compound having a carboxyl group and/or a salt thereof, the kind of the dye, the kind of the solvent component or the like.

In the ink composition of the present invention, the content ratio (by weight) of the cyan-type dye with respect to the aromatic compound having a carboxyl group and/or a salt thereof is preferably from 1:0.5 to 1:10, more preferably from 1:1 to 1:6. With the ratio of the aromatic compound and/or a salt thereof being not lower than 1:0.5, a sufficiently high effect can be obtained on the improvement of bronzing phenomenon, and with the ratio of the aromatic compound having a carboxyl group and/or a salt thereof being not higher than 1:10, clogging reliability and the like can be easily ensured.

In order to stably dissolve a predetermined amount of the dye and a predetermined amount of the aromatic compound having a carboxyl group and/or a salt thereof, the pH (20° C.) of the ink composition is preferably 8.0 or more. Also, on taking account of the material resistance against various members with which the ink composition comes into contact, the pH of the ink composition is preferably 10.5 or less. In order to more successfully attain both the stable dissolution and the material resistance, the pH of the ink composition is more preferably from 8.5 to 10.0.

The ink composition of the present invention may further contain a humectant selected from water-soluble organic solvents and/or saccharides having a vapor pressure smaller than that of pure water.

By containing a humectant, the evaporation of water content can be suppressed and the ink can retain moisture in the inkjet recording system. When the humectant is a water-soluble organic solvent, the ejection stability may be improved or the viscosity can be easily varied without causing any change in the ink properties.

The water-soluble organic solvent means a medium having a function of dissolving a solute and is selected from water-soluble organic solvents having a vapor pressure smaller than that of water. Specific examples thereof include polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol and dipropylene glycol; ketones such as acetonylacetone; esters such as γ-butyrolactone and triethyl phosphate; furfuryl alcohol, tetrahydrofurfuryl alcohol and thiodiglycol.

Preferred examples of the saccharide include maltitol, sorbitol, glyconolactone and maltose.

The humectant is preferably added in an amount of 5 to 50 wt %, more preferably from 5 to 30 wt %, still more preferably from 5 to 20 wt %, based on the entire amount of the ink composition. With the amount of 5 wt % or more, moisture retentivity can be obtained, and with the amount of 50 wt % or less, the viscosity can be easily adjusted to a viscosity for use in the inkjet recording.

The ink composition of the present invention preferably contains a nitrogen-containing organic solvent as the solvent. Examples of the nitrogen-containing organic solvent include 1,3-dimethyl-2-imidazolidinone, 2-pyrrolidone, N-methyl-2-pyrrolidone and ϵ-caprolactam. Among these, 2-pyrrolidone is preferred. These nitrogen-containing organic solvents may be used individually or in combination of two or more thereof.

The content of the nitrogen-containing organic solvent is preferably from 0.5 to 10 wt %, more preferably from 1 to 5 wt %. With the content of 0.5 wt % or more, its addition brings about improvement of solubility of the coloring material for use in the present invention, and with the content of 10 wt % or less, the material resistance against various members with which the ink composition comes into contact is not worsened.

The ink composition of the present invention preferably contains a nonionic surfactant as an additive effective in obtaining swift fixing (penetrability) of ink and at the same time, maintaining the roundness of 1 dot.

Examples of the nonionic surfactant for use in the present invention include acetylene glycol-base surfactants. Specific examples of the acetylene glycol-base surfactant include SURFYNOL 465, SURFYNOL 104 and OLFIN STG (trade names, all are produced by Nisshin Chemical Industry Co.). The amount of the nonionic surfactant added is preferably from 0.1 to 5 wt %, more preferably from 0.5 to 2 wt %. With the amount added of 0.1 wt % or more, sufficiently high penetrability can be obtained, and with the amount added of 5 wt % or less, the image can be readily prevented from generation of bleeding.

In addition to the nonionic surfactant, when a glycol ether is added as a penetration accelerator, penetrability is more enhanced and on performing color printing, bleeding at the boundary between adjacent color inks is reduced and a very sharp image can be obtained.

Examples of the glycol ether for use in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether and triethylene glycol monobutyl ether. The amount of the glycol ether added is preferably from 3 to 30 wt %, more preferably from 5 to 15 wt %. If the amount added is less than 3 wt %, the effect of preventing bleeding cannot be obtained, whereas if it exceeds 30 wt %, not only bleeding of image is generated but also oily separation occurs and a dissolution aid such as glycol ethers is required, as a result, the ink is increased in the viscosity and becomes difficult to eject by an inkjet head.

If desired, the ink composition of the present invention may further contain a pH adjusting agent such as triethanolamine and alkali metal hydroxide, a hydrotropy agent such as urea and derivatives thereof, a water-soluble polymer such as sodium alginate, a water-soluble resin, a fluorine-containing surfactant, an antifungal agent, a rust inhibitor and the like.

The ink composition of the present invention may be prepared, for example, by a method where respective components are thoroughly mixed and dissolved and the resulting solution is filtered under pressure through a membrane filter having a pore diameter of 0.8 μm and then subjected to a deaeration treatment using a vacuum pump.

The recording method of the present invention using the above-mentioned ink composition is described below. In the recording method of the present invention, an inkjet recording system of ejecting the ink composition as liquid droplets through fine orifices and attaching the liquid droplets on a recording medium, thereby performing the recording, can be suitably used. However, the ink composition can be of course applied to uses such as general writing tool, recorder and pen plotter.

As for the inkjet recording system, any conventionally known systems can be used. In particular, excellent image recording can be performed by a method of ejecting liquid droplets using vibration of a piezoelectric element (a recording method using an inkjet head which forms ink droplets by the mechanical deformation of an electrostrictive element), or by a method using heat energy.

The present invention is described in greater detail by referring to the following Examples and Comparative Examples. However, the present invention should not be construed as being limited to the following Examples.

EXAMPLES 1 TO 21 AND COMPARATIVE EXAMPLES 1 to 4

Ink compositions of Examples 1 to 21 and Comparative Examples 1 to 4 each was prepared by mixing and dissolving respective components at a blending ratio shown in Tables 1-3 to 1-4 and filtering the resulting solution under pressure through a membrane filter having a pore diameter of 1 μm.

TABLE 1-1

| | | Examples | | | | | | | | |
|---|---|---|---|---|---|---|---|---|---|---|
| | | 1 | 2 | 3 | 4 | 5 | 6 | 7 | 8 | 9 |
| Coloring material | C.I. Direct Blue 199 (*1) | 1 | 1 | 1 | 1 | 1 | 2.5 | 1 | 1 | 1 |
| | C.I. Direct Blue 199 (*2) | — | — | — | — | 1 | 1 | — | — | — |
| Organic solvent | glycerin | 10 | 10 | 10 | 10 | 10 | 10 | 10 | 10 | 10 |
| | triethylene glycol | 5 | 2 | 7 | 2 | 10 | 10 | 7 | 3 | 3 |
| | 2-pyrrolidone | 7 | — | 3 | 10 | — | — | — | — | — |
| | OLFIN E1010 (produced by Nisshin Chemical Industry Co.) | 1 | 1 | — | 0.5 | 1 | 1 | 1 | 1 | 1 |
| | OLFIN STG (produced by Nisshin Chemical Industry Co.) | — | 0.5 | 0.6 | 0.3 | — | 0.1 | 0.1 | 0.1 | 0.1 |
| | diethylene glycol monobutyl ether | — | — | — | — | 10 | — | — | — | — |
| | triethylene glycol monobutyl ether | 10 | 10 | 10 | 8 | — | 10 | 10 | 10 | 10 |
| Alkali | aqueous ammonia (30%) | 2 | 1 | 2 | 1 | 0.5 | 2 | 2 | — | — |
| | triethanolamine | 0.2 | 0.2 | 0.2 | 0.2 | 0.2 | 0.2 | 0.2 | 0.2 | 0.2 |
| | sodium hydroxide | — | — | — | — | — | — | — | 0.0 | — |
| | lithium hydroxide (monohydrate) | — | — | — | — | — | — | — | — | 1 |
| Anti-bronzing additive | 2-naphthoic acid | 4 | — | — | — | — | — | — | 4 | 4 |
| | 3-hydroxy-2-naphthoic acid | — | 2 | — | — | — | — | — | — | — |
| | 6-hydroxy-2-naphthoic acid | — | — | 4 | 2 | 1 | 4 | — | — | — |
| | 4-hydroxy-benzoic acid | — | — | — | — | — | — | 4 | — | — |
| | 1-hydroxy-2-naphthoic acid | — | — | — | — | — | — | — | — | — |
| | sodium 2-naphthoate | — | — | — | — | — | — | — | — | — |
| | 1-naphthoic acid | — | — | — | — | — | — | — | — | — |
| | 2-hydrox-1-naphthoic acid | — | — | — | — | — | — | — | — | — |
| | L-proline | — | — | — | — | — | — | — | — | — |
| Antiseptic | Proxel XL-2 (produced by Avecia) | 0.3 | 0.3 | 0.3 | 0.3 | 0.3 | 0.3 | 0.3 | 0.3 | 0.3 |
| | Water | bal. | bal. | bal. | bal. | bal. | bal. | bal. | bal. | bal. |

Figure 1:
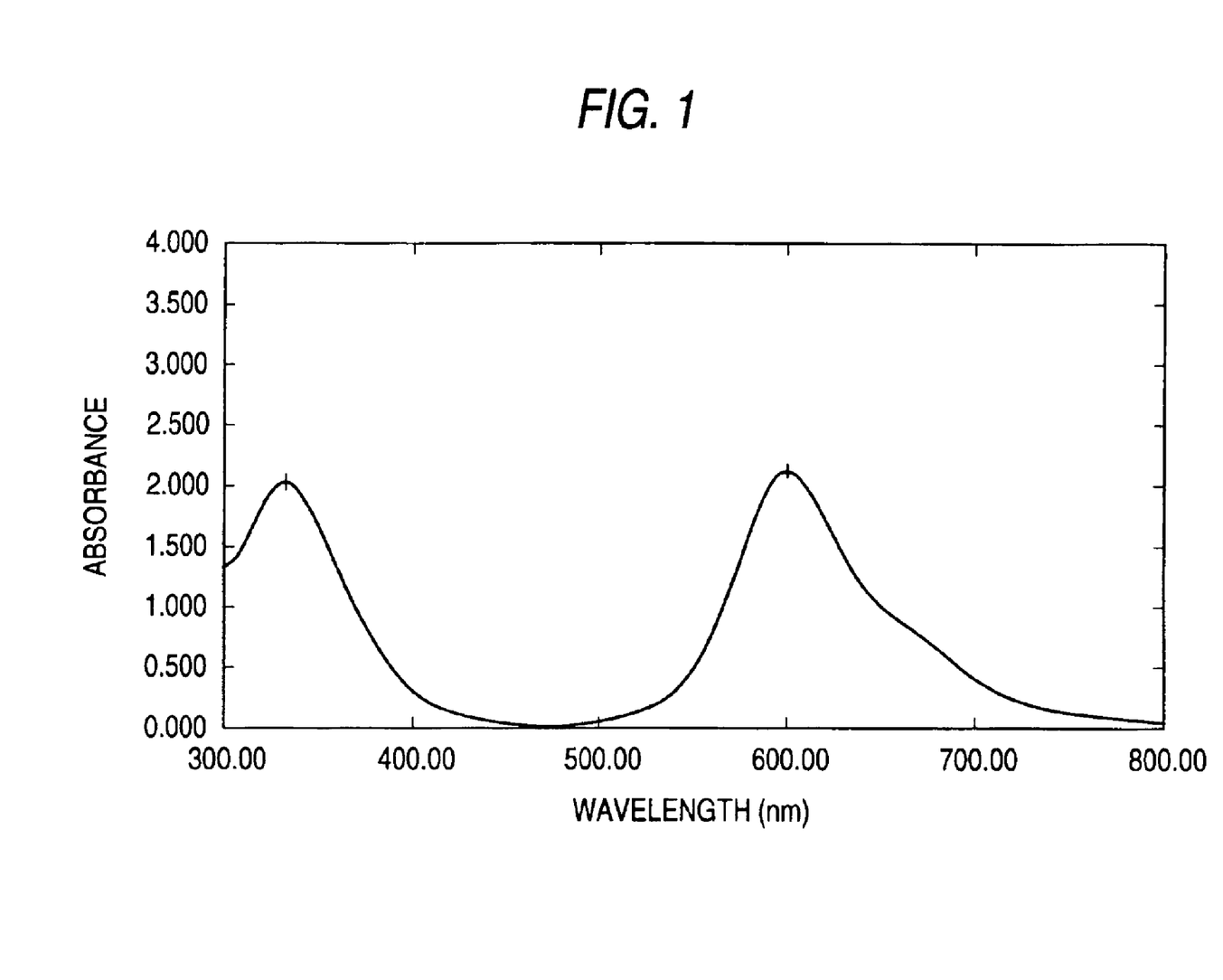
FIG. 1 is a view showing spectral characteristics (absorption wavelength) of the dye (C.I. Direct Blue 199) (*1) used in Examples and Comparative Examples.
Figure 2:
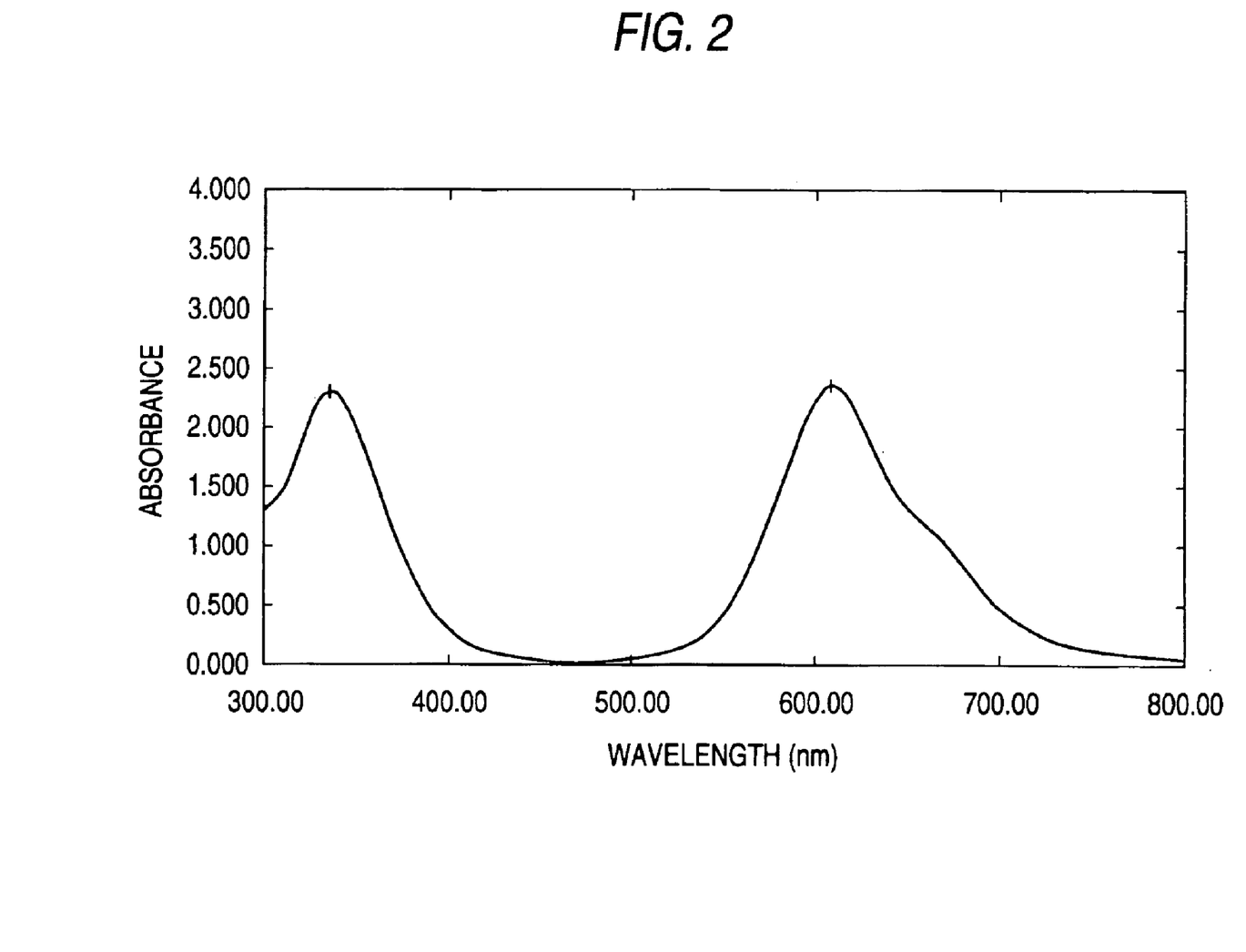
FIG. 2 is a view showing spectral characteristics (absorption wavelength) of the dye (C.I. Direct Blue 199) (*2) used in Examples and Comparative Examples.

Unit: wt %
(*1) A coloring material having spectral characteristics (absorption wavelength) shown in FIG. 1 is used.
(*2) A coloring material having spectral characteristics (absorption wavelength) shown in FIG. 2 is used.

TABLE 1-2

| | | Examples | | | | | |
|---|---|---|---|---|---|---|---|
| | | 10 | 11 | 12 | 13 | 14 | 15 |
| Coloring material | C.I. Direct Blue 199 (*1) | 1 | 1 | 1 | 1 | 1 | 1 |
| | C.I. Direct Blue 199 (*2) | — | — | — | — | 1 | 1 |
| Organic solvent | glycerin | 10 | 10 | 10 | 10 | 10 | 10 |
| | triethylene glycol | 5 | 5 | 5 | 5 | 5 | 5 |
| | 2-pyrrolidone | — | — | — | — | — | — |
| | OLFIN E1010 (produced by Nisshin Chemical Industry Co.) | 1 | 1 | 1 | 1 | 1 | 1 |
| | OLFIN STG (produced by Nisshin Chemical Industry Co.) | 0.1 | 0.1 | 0.1 | 0.1 | 0.1 | 0.1 |
| | diethylene glycol monobutyl ether | — | — | — | — | — | — |
| | triethylene glycol monobutyl ether | 10 | 10 | 10 | 10 | 10 | 10 |
| Alkali | aqueous ammonia (30%) | — | — | — | — | — | — |
| | triethanolamine | 0.2 | 0.2 | 0.2 | 0.2 | 0.2 | 0.2 |
| | sodium hydroxide | — | — | — | — | — | — |
| | lithium hydroxide (monohydrate) | 1 | 1 | — | 1 | 1 | 1 |

TABLE 1-2-continued

|  |  | Examples | | | | | |
| --- | --- | --- | --- | --- | --- | --- | --- |
|  |  | 10 | 11 | 12 | 13 | 14 | 15 |
| Anti-bronzing additive | 2-naphthoic acid | — | — | — | — | — | — |
|  | 3-hydroxy-2-naphthoic acid | 4 | — | — | — | — | — |
|  | 6-hydroxy-2-naphthoic acid | — | 4 | — | — | — | — |
|  | 4-hydroxy-benzoic acid | — | — | — | — | — | — |
|  | 1-hydroxy-2-naphthoic acid | — | — | — | 4 | — | — |
|  | sodium 2-naphthoate | — | — | 4.5 | — | — | — |
|  | 1-naphthoic acid | — | — | — | — | 4 | — |
|  | 2-hydroxy-1-naphthoic acid | — | — | — | — | — | 4 |
|  | L-proline | — | — | — | — | — | — |
| Antiseptic | Proxel XL-2 (produced by Avecia) | 0.3 | 0.3 | 0.3 | 0.3 | 0.3 | 0.3 |
|  | Water | bal. | bal. | bal. | bal. | bal. | bal. |

Unit: wt %
(*1) A coloring material having spectral characteristics (absorption wavelength) shown in FIG. 1 is used.
(*2) A coloring material having spectral characteristics (absorption wavelength) shown in FIG. 2 is used.

TABLE 1-3

|  |  | Comparative Examples | | | |
| --- | --- | --- | --- | --- | --- |
|  |  | 1 | 2 | 3 | 4 |
| Coloring material | C.I. Direct Blue 199 (*1) | 1 | 2.6 | — | 1 |
|  | C.I. Direct Blue 199 (*2) | — | 1 | 4 | — |
| Organic solvent | glycerin | 10 | 10 | 10 | 10 |
|  | triethylene glycol | 5 | 2 | 2 | 6 |
|  | 2-pyrrolidone | 7 | 10 | 10 | — |
|  | OLFIN E1010 (produced by Nisshin Chemical Industry Co.) | 1 | 0.5 | 0.5 | 1 |
|  | OLFIN STG (produced by Nisshin Chemical Industry Co.) | — | 0.3 | 0.3 | 0.1 |
|  | diethylene glycol monobutyl ether | — | — | — | — |
|  | triethylene glycol monobutyl ether | 10 | 8 | 8 | 10 |
| Alkali | aqueous ammonia (30%) | — | — | — | — |
|  | triethanolamine | 0.2 | 0.2 | 0.2 | 0.2 |
|  | sodium hydroxide | — | — | — | — |
|  | lithium hydroxide (monohydrate) | — | — | — | 1 |
| Anti-bronzing additive | 2-naphthoic acid | — | — | — | — |
|  | 3-hydroxy-2-naphthoic acid | — | — | — | — |
|  | 6-hydroxy-2-naphthoic acid | — | — | — | — |
|  | 4-hydroxy-benzoic acid | — | — | — | — |
|  | 1-hydroxy-2-naphthoic acid | — | — | — | — |
|  | sodium 2-naphthoate | — | — | — | — |
|  | 1-naphthoic acid | — | — | — | — |
|  | 2-hydroxy-1-naphthoic acid | — | — | — | — |
|  | L-proline | — | — | — | 4 |
| Antiseptic | Proxel XL-2 (produced by Avecia) | 0.3 | 0.3 | 0.3 | 0.3 |
|  | Water | bal. | bal. | bal. | bal. |

Unit: wt %
(*1) A coloring material having spectral characteristics (absorption wavelength) shown in FIG. 1 is used.
(*2) A coloring material having spectral characteristics (absorption wavelength) shown in FIG. 2 is used.

TABLE 1-4

|  |  | Examples | | | | | |
| --- | --- | --- | --- | --- | --- | --- | --- |
|  |  | 16 | 17 | 18 | 19 | 20 | 21 |
| Coloring material | C.I. Direct Blue 199 (*1) | 2 | 1 | 1 | 2.5 | 1 | 2 |
|  | C.I. Direct Blue 199 (*2) | 2 |  |  | 1 |  | 2 |
| Organic solvent | glycerin | 10 | 10 | 10 | 10 | 10 | 10 |
|  | triethylene glycol | 10 | 7 | 5 | 2 | 7 | 2 |
|  | 2-pyrrolidone |  |  | 7 | 5 | 3 | 5 |
|  | OLFIN E1010 (produced by Nisshin Chemical Industry Co.) | 1 | 1 | 1 | 1 |  | 0.5 |
|  | OLFIN D51 (produced by Nisshin Chemical Industry Co.) | 0.1 |  |  | 0.5 | 0.5 | 0.3 |
|  | diethylene glycol monobutyl ether | — | — | — | — | — | — |
|  | triethylene glycol monobutyl ether | 10 | 10 | 10 | 10 | 10 | 8 |
| Alkali | aqueous ammonia (30%) | 2 | 1.2 | 2 | 1 | 1.4 | 4 |
|  | triethanolamine | 0.2 | 0.2 | 0.2 | 0.2 | 0.2 | 0.2 |

TABLE 1-4-continued

|  |  | Examples | | | | | |
|---|---|---|---|---|---|---|---|
|  |  | 16 | 17 | 18 | 19 | 20 | 21 |
| Anti-bronzing additive | 2-naphthoic acid | | | | | | |
|  | 3-hydroxy-2-naphthoic acid | | | | | | |
|  | 6-hydroxy--2-naphthoic acid | 4 | | | | | |
|  | 4-hydroxy-benzoic acid | | 4 | | | | |
|  | 3-methoxy-2-naphthoic acid | | | 4 | | | |
|  | 6-methoxy-2-naphthoic acid | | | | 2 | | |
|  | 6-ethoxy-2-naphthoic acid | | | | | 0.1 | 10 |
|  | L-proline | | | | | | |
| Antiseptic | Proxel XL-2 (produced by AVECIA) | 0.3 | 0.3 | 0.3 | 0.3 | 0.3 | 0.3 |
|  | Water | bal. | bal. | bal. | bal. | bal. | bal. |

Unit: wt %
(*1) A coloring material having spectral characteristics (absorption wavelength) shown in FIG. 1 is used.
(*2) A coloring material having spectral characteristics (absorption wavelength) shown in FIG. 2 is used.

In Tables, each component in the ink composition is shown by wt % of each component based on the entire amount of the ink composition and the balance is water.

The ink compositions of Examples 1 to 21 and Comparative Examples 1 to 4 each was filled in a special cartridge (cyan chamber) for an inkjet printer EM930C (manufactured by Seiko Epson Corporation) and printing was performed on an inkjet special recording medium (PM photographic paper (Premium Glossy Photo Paper) and special gloss film (Photo Quality Glossy Film), both are produced by Seiko Epson Corporation) using the printer. At this time, the following evaluations were made. The results obtained are shown in Tables 2 and 3.

Evaluation of Bronzing

Solid printing was performed using the cartridge prepared above to give a hitting amount of 1.5 to 2.2 mg per 1 inch square and the printed matter obtained was measured (measuring angle: 60°) using a gloss meter (PG-1M, manufactured by Nippon Denshoku Industries Co., Ltd.) to determine the glossiness. The printing was performed in two environments of 25° C.-40% RH and 35° C.-60% RH (in Examples 16 to 21, only in 25° C.-40% RH).

The value obtained from the glossiness according to the following formula was used as the criterion. Glossiness (printed matter)—glossiness (recording medium)

<Criteria>
A: less than 15
B: from 15 to less than 35
C: from 35 to less than 55
D: 55 or more Evaluation of Ozone Fastness Using the cartridge prepared above, printing was performed while adjusting the applied duty to give an OD (optical density) falling within the range from 0.9 to 1.1. Then, the printed matter obtained was exposed using an ozone weather meter Model OMS-H (trade name, manufactured by Suga Test Instruments Co., Ltd.) under the condition of 24° C., a relative humidity of 60% RH and an ozone concentration of 2 ppm for a predetermined time (6 hours, 12 hours).

After the exposure, the printed matters each was measured on OD by a densitometer (Spectrolino, manufactured by Gretag) and the residual optical density (ROD) was determined according to the following formula and evaluated according to the criteria shown below:

$$ROD(\%)=(D/D_0)\times 100$$

D: OD after exposure test
$D_0$: OD before exposure test
(provided that the measurement conditions were as follows. Filter: red, Light source: D50, and View angle: 2°).

<Criteria>
A: ROD is 90% or more.
B: ROD is from 80% to less than 90%.
C: ROD is from 70% to less than 80%.
D: ROD is less than 70%.

Clogging Resistance

The ink compositions of Examples 1 to 15 each was filled in an inkjet printer EM-930C (manufactured by Seiko Epson Corporation) and after printing was continuously performed for 10 minutes and the ejection of ink from the nozzle was confirmed, the printing was stopped. The printer was then allowed to stand without capping the head in an environment at 40° C. and 25% RH for two weeks. Thereafter, a cleaning operation of the nozzle and then printing were performed. The clogging property of the ink was evaluated by the number of cleaning operations performed until printing failures such as thinning and missing did not occur and printing equal to the initial printing could be performed.

<Criteria>
A: Printing equal to initial printing is obtained by performing the cleaning operation from 1 to 5 times.
B: Printing equal to initial printing is obtained by performing the cleaning operation from 6 to 10 times.
C: Printing equal to initial printing is obtained by performing the cleaning operation from 11 to 15 times.
D: Printing equal to initial printing was not obtained even by performing the cleaning operation 16 times or more.

Evaluation of Resistance Against Nitrogen Oxide

Using the cartridge prepared above by filling each ink composition of Examples 18 to 21, printing was performed while adjusting the duty to give an OD (optical density) falling within the range from 0.9 to 1.0. Then, the printed matter obtained was exposed using a gas corrosion tester Model GS-UV (trade name, manufactured by Suga Test Instruments Co., Ltd.) under the condition of 24° C., a relative humidity of 60% RH and a nitrogen dioxide concentration of 10 ppm for a predetermined time (6 hours, 12 hours).

After the exposure, the printed matters each was measured on the CIE-L*a*b* coordinate by a densitometer (Spectrolino, manufactured by Gretag) and the color difference ($\Delta D$) was determined according to the following formula and evaluated according to the criteria shown below:

$$\Delta E=\{(L^*-L_0^*)^2+(a^*-a_0^*)^2+(b^*-b_0^*)^2\}^{1/2}$$

$L^*, a^*, b^*$: respective coordinate value after exposure test
$L_0^*, a_0^*, b_0^*$: respective coordinate value before exposure test <Criteria>
A: $\Delta E$ is less than 1.
B: $\Delta E$ is from 1 to less than 3.
C: $\Delta E$ is from 3 to less than 6.
D: $\Delta E$ is 6 or more.

TABLE 2

|  |  |  | Examples | | | | | | | | | |
|---|---|---|---|---|---|---|---|---|---|---|---|---|
|  |  |  | 1 | 2 | 3 | 4 | 5 | 6 | 7 | 8 | 9 |
| Anti-bronzing property | 25° C.•40% RH | | A | A | A | A | A | A | B | A | A |
|  | 35° C.•60% RH | | C | C | B | C | C | B | C | C | A |
| Ozone fastness | PM Photographic paper | 6 hours | A | A | A | A | A | A | A | A | A |
|  |  | 12 hours | B | B | B | B | B | B | B | B | B |
|  | Special gloss film | 6 hours | A | A | A | A | B | A | A | A | A |
|  |  | 12 hours | B | B | B | B | B | C | B | B | B |
| Clogging resistance |  |  | C | B | B | B | B | C | — | C | A |

|  |  |  | Examples | | | | | | Comparative Examples | | | |
|---|---|---|---|---|---|---|---|---|---|---|---|---|
|  |  |  | 10 | 11 | 12 | 13 | 14 | 15 | 1 | 2 | 3 | 4 |
| Anti-bronzing property | 25° C.•40% RH | | A | A | A | A | B | B | C | C | B | C |
|  | 35° C.•60% RH | | A | A | C | A | B | B | C | C | B | C |
| Ozone fastness | PM Photographic paper | 6 hours | A | A | A | A | A | A | A | A | B | — |
|  |  | 12 hours | B | B | B | B | B | B | B | B | B | — |
|  | Special gloss film | 6 hours | A | A | A | A | A | A | A | A | C | — |
|  |  | 12 hours | B | B | B | B | B | B | B | B | C | — |
| Clogging resistance |  |  | A | A | C | A | A | A | — | — | — | — |

TABLE 3

|  |  |  | Examples | | | | | |
|---|---|---|---|---|---|---|---|---|
|  |  |  | 16 | 17 | 18 | 19 | 20 | 21 |
| Anti-bronzing property | 25° C.•40% RH | | A | B | A | A | B | A |
| Ozone fastness | PM Photographic paper | 6 hours | A | A | A | A | A | A |
|  |  | 12 hours | B | B | B | B | B | B |
|  | Special gloss film | 6 hours | A | A | A | A | A | A |
|  |  | 12 hours | B | B | B | B | B | B |
| Resistance against nitrogen oxide | PM Photographic paper | 6 hours | — | — | A | A | A | A |
|  |  | 12 hours | — | — | A | A | A | A |
|  | Special gloss film | 6 hours | — | — | A | A | A | A |
|  |  | 12 hours | — | — | A | A | A | A |

As described in the foregoing pages, in the present invention, an aromatic compound having a carboxyl group and/or a salt thereof is incorporated into the ink composition, whereby an excellent effect is provided that an image recorded using the ink composition is excellent in the fastness (mainly fastness to gas and light) of printed matter and free of generation of a bronzing phenomenon. Furthermore, when the aromatic compound having a carboxyl group and/or a salt thereof has a —OR group (wherein R is C1–C6 alkyl group), an image having excellent resistance against nitrogen oxide can be obtained and at the same time, the bronzing phenomenon can be remarkably improved.

While the invention has been described in detail and with reference to specific examples thereof, it will be apparent to one skilled in the art that various changes and modifications can be made therein without departing from the spirit and scope thereof.

What is claimed is:

1. An ink composition comprising at least:
   water;
   a cyan dye that is a metal phtalocyanine dye; and
   an aromatic compound having a naphthalene skeleton with a carboxyl group at the 2-position and/or a salt thereof.

2. The ink composition according to claim 1, wherein said metal phthalocyanine dye is a copper phthalocyanine dye represented by the following formula (1):

wherein $R^1$ represents H, an alkali metal or —$NH_4$, $R^2$ represents an alkali metal or —$NH_4$, $R^3$ represents H, an alkyl group which may be substituted, or an aryl group which may be substituted, k, l and n each represents an integer of 0 to 3, and m represents an integer of 1 to 4, provided that the sum of k, l, m and n is 4.

3. The ink composition according to claim 2, wherein said copper phthalocyanine dye is at least one of C.I. Direct Blue 86, 87 and 199.

4. The ink composition according to claim 1, wherein said metal phthalocyanine dye is a dye having an absorption spectrum in the visible region (400 to 800 nm) with a maximum absorption peak at a wavelength of 590 to 650 nm.

5. The ink composition according to claim 1, wherein said metal phtbalocyanine dye is a dye having an absorption spectrum in the visible region (400 to 800 nm) with a maximum absorption peak at a wavelength of 590 to 615 nm.

6. The ink composition according to claim 1, wherein said metal phthalocyanine dye is a dye having an absorption spectrum in the visible region (400 to 800 nm) with a maximum absorption peak at a wavelength of 590 to 605 nm.

7. The ink composition according to claim 1, wherein said aromatic compound having a carboxyl group and/or a salt thereof is an aromatic compound having one carboxyl group and/or a salt thereof.

8. The ink composition according to claim 1, wherein said compound having a naphthalene skeleton and/or a salt thereof is a compound having the carboxyl group and a —OR group, wherein R is a C1–C6 alkyl group, in the naphthalene skeleton and/or a salt thereof.

9. The ink composition according to claim 8, wherein said compound having a naphthalene skeleton and/or a salt thereof is a compound having one carboxyl group and one —OR group, wherein R is a C1–C6 alkyl group, in the naphthalene skeleton and/or a salt thereof.

10. The ink composition according to claim 1, wherein said compound having a carboxyl group at the 2-position and having a naphthalene skeleton and/or a salt thereof is at least one member selected from the group consisting of 1-hydroxy-2-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid and their salts.

11. The ink composition according to claim 1, wherein said salt is a lithium salt.

12. The ink composition according to claim 1, which comprises said aromatic compound having a carboxyl group and/or a salt thereof in an amount of 0.1 to 10 wt % based on the entire amount of the ink composition.

13. The ink composition according to claim 1, wherein the content ratio of said cyan dye and said aromatic compound having a carboxyl group and/or a salt thereof is from 1:0.5 to 1:10.

14. The ink composition according to claim 1, which further comprises a nonionic surfactant.

15. The ink composition according to claim 14, wherein said nonionic surfactant is an acetylene glycol surfactant.

16. The ink composition according to claim 14, which comprises said nonionic surfactant in an amount of 0.1 to 5 wt % based on the entire amount of the ink composition.

17. The ink composition according to claim 1, which further comprises a penetration accelerator.

18. The ink composition according to claim 17, wherein said penetration accelerator is a glycol ether.

19. The ink composition according to claim 1, wherein the pH of the ink composition at 20° C. is from 8.0 to 10.5.

20. An inkjet recording method of performing the recording by ejecting a liquid droplet of an ink composition and attaching said liquid droplet to a recording medium, wherein the ink composition is an ink composition according to claim 1.

21. The inkjet recording method according to claim 20, wherein said ejected liquid droplet is formed by mechanical deformation of an electrostrictive element.

22. Recorded matter which is recorded with the ink composition according to claim 1.

23. Recorded matter which is recorded by a the recording method according to claim 20.

24. The ink composition according to claim 1, wherein the cyan dye is present in the ink composition in an amount of 0.1 to 10 wt % and the aromatic compound and/or salt thereof is present in the ink composition in an amount effective for reducing a propensity for bronzing of an ink image formed with the ink composition as compared with an ink image formed with the ink composition without the aromatic compound and/or salt thereof.

25. The ink composition according to claim 24, wherein the aromatic compound and/or salt thereof is present in the ink composition in an amount of from 0.5 to 5 wt %.

26. The ink composition according to claim 25, wherein the cyan dye and the aromatic compound and/or salt thereof are present in the ink composition in a ratio of from 1:0.5 to 1:10.

* * * * *